United States Patent
Cain

(10) Patent No.: US 6,697,325 B1
(45) Date of Patent: Feb. 24, 2004

(54) SYSTEM, DEVICE, AND METHOD FOR EXPEDITING RECONVERGENCE IN A COMMUNICATION NETWORK

(75) Inventor: Bradley Cain, Cambridge, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/455,653

(22) Filed: Dec. 7, 1999

(51) Int. Cl.[7] .............................................. H04L 12/26
(52) U.S. Cl. ...................................... 370/217; 370/255
(58) Field of Search ................................ 370/238, 254, 370/255, 351, 400, 401, 392, 217, 218

(56) References Cited

U.S. PATENT DOCUMENTS

| | | | |
|---|---|---|---|
| 5,265,092 A | * 11/1993 | Soloway et al. | 370/238 |
| 5,671,357 A | 9/1997 | Humblet et al. | 395/200.11 |
| 5,995,503 A | * 11/1999 | Crawley et al. | 370/351 |
| 6,122,753 A | * 9/2000 | Masuo et al. | 714/4 |

\* cited by examiner

*Primary Examiner*—Melvin Marcelo
(74) *Attorney, Agent, or Firm*—Steubing McGuinness & Manaras LLP

(57) ABSTRACT

In a system, device, and method for expediting reconvergence in a communication network, a first indication of a communication link failure prompts a node to compute new routes. Upon receiving the first indication of the communication link failure, the node determines the nodes that are associated with the failed communication link. The node disassociates the failed communication link from all such nodes, and computes new routes. Subsequent indications of the same communication link failure are ignored.

36 Claims, 3 Drawing Sheets

SYSTEM, DEVICE, AND METHOD FOR EXPEDITING RECONVERGENCE IN A COMMUNICATION NETWORK

FIELD OF THE INVENTION

The present invention relates generally to communication systems, and more particularly to expediting reconvergence in a communication system.

BACKGROUND OF THE INVENTION

In today's information age, communication networks are often used for interconnecting computers and computer peripherals. A communication network typically includes a number of nodes that interoperate to route protocol messages. The various nodes in the communication network utilize various routing protocols in order to determine the routes that are used to route the protocol messages.

One type of routing protocol, known as a "link state" routing protocol, determines routes based upon the status of communication links between the various nodes. A link state routing protocol, such as OSPF and IS-IS, requires each node to have complete topology information. Each node maintains a topology database that indicates all nodes in the communication network and lists the communication links that are associated with each node.

The various nodes in the communication network exchange link status information using link state advertisement (LSA) protocol messages. Specifically, each node periodically tests the communication links to each of its neighbors and sends a LSA protocol message including the link status information to all of the other nodes. Each node computes the routes based upon the link status information received from the other nodes.

When a node receives a LSA protocol message, the node updates its topology database based upon the link status information received in the LSA protocol message, and runs a special algorithm to determine the routes based upon the updated topology information. One well-known algorithm for determining routes is the Dijkstra shortest path algorithm. The Dijkstra shortest path algorithm computes the shortest paths to all destinations from a single source.

When a communication link fails, the various nodes in the communication network interoperate to route protocol messages around the failed communication link. This is often referred to as "reconvergence." Each node that supports the failed communication link (referred to hereinafter as a "supporting" node) sends an LSA protocol message to the other nodes in the communication network identifying the failed communication link. Each supporting node may detect the communication link failure at a different time, and therefore each supporting node may send the LSA protocol message at a different time. Each node updates its topology database to reflect the failed communication link, based upon the link status information from the LSA protocol messages, and uses the Dijkstra shortest path algorithm in order to compute new routes.

In one prior art embodiment, a node computes new routes each time it receives an LSA protocol message. Specifically, upon receiving an LSA protocol message, a node updates its topology database based upon the link status information in the LSA protocol message, and computes new routes based upon the updated topology database.

In the case of a communication link failure, each supporting node sends an LSA protocol message identifying the failed communication link. When a node receives such an LSA protocol message from a supporting node, the node updates its topology database, specifically by removing the failed communication link from the list of communication links associated with the supporting node, and then computes new routes based upon the updated topology database. Because each node may receive multiple LSA protocol messages relating to the same communication link failure, each node may update its topology database and compute new routes multiple times for the same communication link failure. Reconvergence is not complete until all LSA protocol messages are processed, since each LSA protocol message identifies the communication link failure from the perspective of one particular supporting node. Furthermore, the Dijkstra shortest path algorithm is computationally intensive and can take a relatively long time to complete, especially in communication networks having many nodes, so it is desirable to reduce the number of times new routes are computed, preferably once per communication link failure.

In another prior art embodiment, each node computes new routes based upon link status information received over a period of time. Specifically, upon receiving a first LSA protocol message, a node updates its topology database based upon the link status information in the LSA protocol message, and starts a timer. If the node receives additional LSA protocol messages while the timer is running, the node updates its topology database based upon the link status information in the additional LSA protocol messages. This allows the node to receive multiple LSA protocol messages relating to the same communication link failure before computing new routes. When the timer expires, the node computes new routes based upon all link status information received during the timeout period. This reduces the number of times the routes are computed, but delays reconvergence.

In the case of a communication link failure, each supporting node sends an LSA protocol message identifying the failed communication link. When a node receives a first such LSA protocol message from a supporting node, the node updates its topology database, specifically by removing the failed communication link from the list of communication links associated with the supporting node, and starts the timer. During the timeout period, the node receives additional LSA protocol messages from the other supporting nodes. For all such additional LSA protocol messages, the node updates its topology database, specifically by removing the failed communication link from the lists of communication links associated with the other supporting nodes. When the timer expires, the node computes new routes based upon the updated topology database, which includes all link status information received during the timeout period. The node only computes new routes once, although, as before, reconvergence is not complete until all LSA protocol messages are processed.

In order for the communication network to operate efficiently, it is important for reconvergence to occur as quickly as possible following a communication link failure. Unfortunately, in both prior art embodiments described above, reconvergence does not occur until each node processes LSA protocol messages from all supporting nodes. This may take a substantial amount of time, during which the nodes may continue routing protocol messages to the failed communication link.

Thus, a technique for expediting reconvergence following a communication link failure is needed.

SUMMARY OF THE INVENTION

In accordance with one aspect of the invention, a first indication of a communication link failure prompts a node to compute new routes. Upon receiving the first indication of the communication link failure, the node determines the nodes that are associated with the failed communication link. The node disassociates the failed communication link from all such nodes, and computes new routes. Subsequent indications of the same communication link failure are ignored.

More particularly, upon receiving a LSA protocol message from a supporting node indicating a communication link failure, the node updates its topology database by removing the failed communication link from the list of communication links associated with the supporting node. The node then uses its topology database to determine other nodes that are associated with the failed communication link, and updates its topology database by removing the failed communication link from the lists of communication links associated with the other nodes. The node then computes new routes based upon the updated topology database.

The node ignores any subsequent LSA protocol messages relating to the same communication link failure. A caching mechanism is preferably used to determine whether a particular LSA protocol message is related to a previous communication link failure.

One advantage of the present invention is that the node only computes new routes once for each communication link failure.

Another advantage of the present invention is that reconvergence is achieved upon processing the first LSA protocol message indicating the communication link failure.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
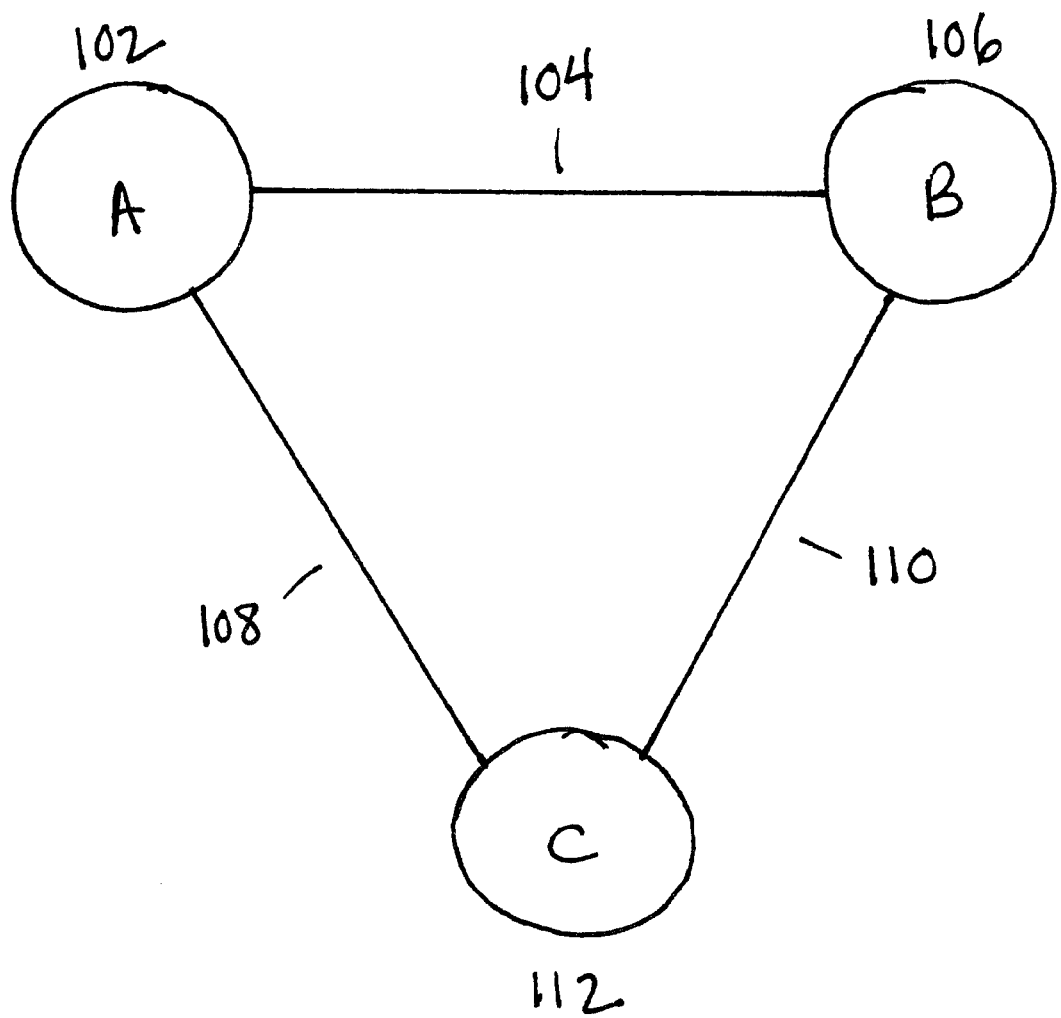
FIG. 1 shows an exemplary communication network having three interconnected nodes in accordance with an embodiment of the invention.

An embodiment of the present invention expedites reconvergence following a communication link failure. Specifically, when a node receives a first LSA protocol message from a supporting node indicating a communication link failure, the node updates its topology database, specifically by removing the failed communication link from the list of communication links associated with the supporting node. Then, instead of waiting for additional LSA protocol messages from other supporting nodes, the node uses its topology database to determine other supporting nodes that are associated with the failed communication link, and removes the failed communication link from the lists of communication links associated with those other supporting nodes. As a result, the topology database is in the same state that it would be had the node waited for the additional LSA protocol messages from the other supporting nodes. Once the topology database is updated, the node computes new routes based upon the updated topology database. In this way, the node expedites reconvergence by computing new routes once per communication link failure upon receiving the first LSA protocol message.

The node ignores any subsequent LSA protocol messages that are related to the same communication link failure in order to prevent unnecessary and redundant iterations of the Dijkstra shortest path algorithm. In order to ignore any subsequent LSA protocol messages that are related to the same communication link failure, the node must determine whether a particular LSA protocol message is related to the same communication link failure. In an exemplary embodiment of the invention, the node uses a caching mechanism in order to identify LSA protocol messages that are related to the same communication failure. Specifically, the node stores the link status information from the first LSA protocol message in a cache as part of the processing of the first LSA protocol message. The link status information identifies the failed communication link. When the node receives a subsequent LSA protocol message, the node compares the link status information in the subsequent LSA protocol message to the link status information in the cache in order to determine whether the subsequent LSA protocol message is related to the same communication link failure as the first LSA protocol message. In particular, the node compares the link status information in the subsequent LSA protocol message to the link status information in the cache in order to determine whether the LSA protocol message indicates the same communication link failure. If the subsequent LSA protocol message is related to the same communication link failure as the firs t LSA protocol message, then the node discards the subsequent LSA protocol message without computing new routes. The cache can be used to store link status information relating to multiple communication link failures in order to prevent unnecessary and redundant iterations of the Dijkstra shortest path algorithm for any of such communication link failures. The link status information relating to a particular communication link failure is deleted from the cache after a predetermined period of time.

FIG. 1 shows an exemplary communication network 100 having three interconnected nodes, namely node A 102, node B 106, and node C 112. Node A 102 and node B 106 are interconnected over the communication link 104, and are the supporting nodes for the communication link 104. Node B 106 and node C 112 are interconnected over the communication link 110, and are the supporting nodes for the communication link 110. Node A 102 and node C 112 are interconnected over the communication link 108, and are the supporting nodes for the communication link 108.

Each node has complete topology information, which it maintains in a topology database. The topology database indicates all nodes in the communication network, and lists the communication links that are associated with each node. The topology database maintained by node A 102 indicates that node B 106 is associated with communication links 104 and 110, and indicates that node C 112 is associated with communication links 108 and 110. The topology database maintained by node B 106 indicates that node A 102 is associated with communication links 104 and 108, and indicates that node C 112 is associated with communication links 108 and 110. The topology database maintained by node C 112 indicates that node A 102 is associated with communication links 104 and 108, and indicates that node B 106 is associated with communication links 104 and 110.

Each node periodically tests its associated communication links, and provides the link status information to the other nodes by sending the link status information to the other nodes in LSA protocol messages. Node A 102 provides link status information for communication links 104 and 108 to node B 106 and node C 112. Node B 106 provides link status information for communication links 104 and 110 to node A 102 and node C 112. Node C 112 provides link status information for communication links 108 and 110 to node A 102 and node B 106.

When a communication link fails, each supporting node sends an LSA protocol message to the other nodes identifying the failed communication link. For example, assume the communication link 104 fails. When node A 102 detects the communication link failure, node A 102 sends an LSA protocol message to node B 106 and node C 112 indicating that the communication link 104 failed. Likewise, when node B 106 detects the communication link failure, node B 106 sends an LSA protocol message to node A 102 and node C 112 indicating that the communication link 104 failed. It is likely that node A 102 and node B 106 will detect the communication link failure at different times, and therefore node A 102 will send an LSA protocol message at a different time than node B 106.

When node C 112 receives the first LSA protocol message indicating the failure of the communication link 104, for example, from node A 102, node C 112 updates its topology database by removing the communication link 104 from the list of communication links associated with node A 102. Node C 112 then uses the topology database to determine that node B 106 is also associated with the communication link 104 and updates its topology database by removing the communication link 104 from the list of communication links associated with node B 106. Node C 112 then computes new routes based upon the updated topology database. Node C 112 also stores the link status information from the first LSA protocol message indicating the failure of the communication link 104 in a cache.

When node C 112 receives a subsequent LSA protocol message relating to the failure of the communication link 104, from node B 106, node C 112 discards the LSA protocol message without computing new routes. Specifically, upon receiving the subsequent LSA protocol message from node B 106, node C 112 compares the link status information in the subsequent LSA protocol message to link status information in the cache, and determines that the subsequent LSA protocol message is related to the same communication link failure as the first LSA protocol message. Having already removed the communication link 104 from the list of communication links associated with node B 106 and computed new routes, node C 112 simply discards the subsequent LSA protocol message from node B 106.

Figure 2:
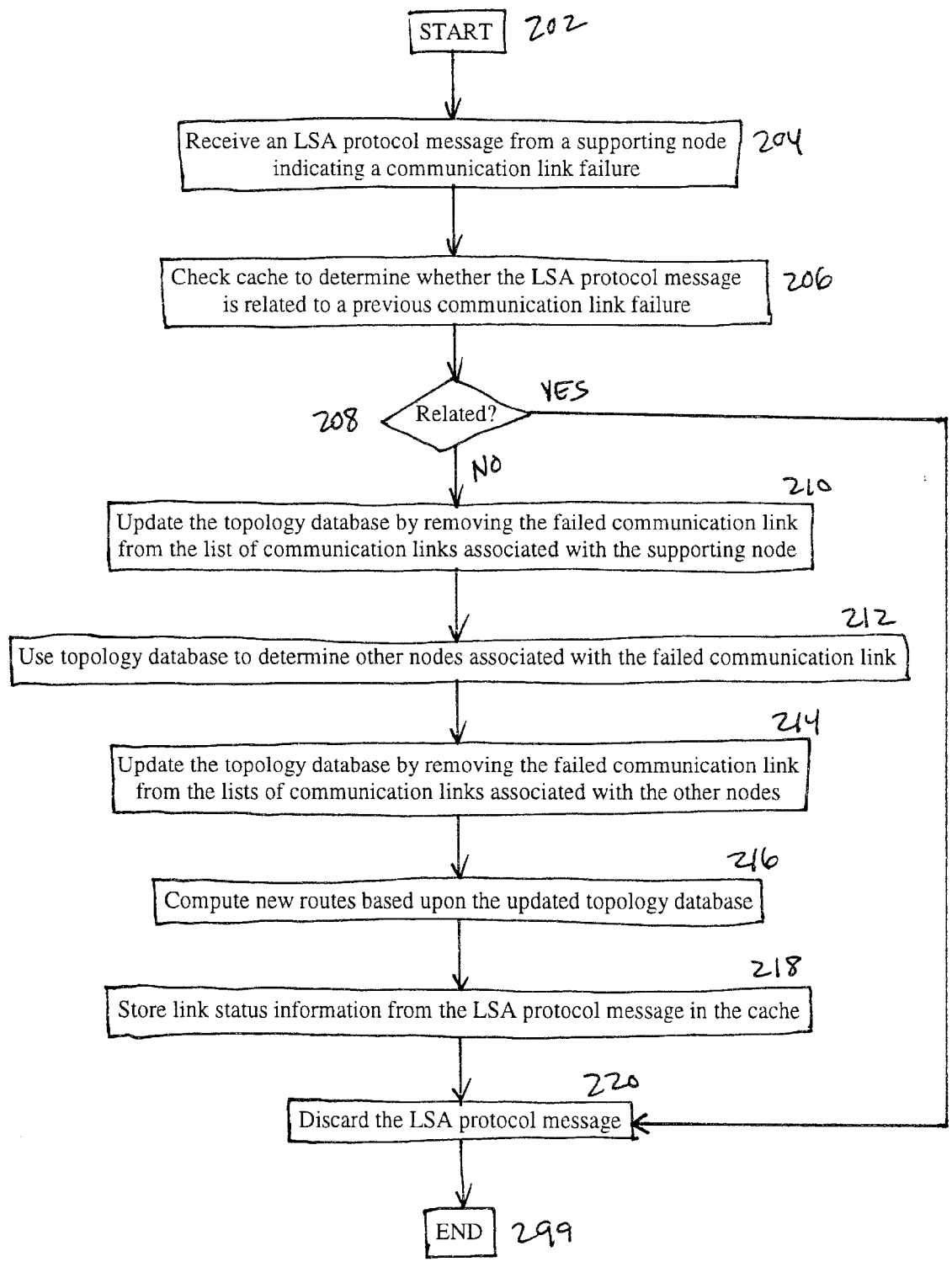
FIG. 2 is a logic flow diagram showing exemplary logic for processing a link state advertisement protocol message in accordance with an embodiment of the invention.

FIG. 2 is a logic flow diagram showing exemplary logic 200 for processing a LSA protocol message in accordance with an embodiment of the invention. Beginning at step 202, and upon receiving an LSA protocol message from a supporting node indicating a communication link failure, in step 204, the logic checks the cache to determine whether the LSA protocol message is related to a previous communication link failure, in step 206. In particular, the logic compares the link status information in the received LSA protocol message to the link status information in the cache in order to determine whether the LSA protocol message indicates a previous communication link failure. If the LSA protocol message is related to a previous communication link failure (YES in step 208), then the logic discards the LSA protocol message without computing new routes, in step 220. If the LSA protocol message is not related to a previous communication link failure (NO in step 208), then the logic proceeds to update the topology database by removing the failed communication link from the list of communication links associated with the supporting node, in step 210. The logic then uses the topology database to determine any other nodes that are associated with the failed communication link, in step 212, and updates the topology database by removing the failed communication link from the lists of communication links associated with the other nodes, in step 214. The logic then computes new routes based upon the updated topology database, in step 216. The logic also stores link status information from the LSA protocol message in the cache, in step 218. The link status information identifies the failed communication link. The logic discards the LSA protocol message, in step 220. The logic 200 terminates in step 299.

Figure 3:
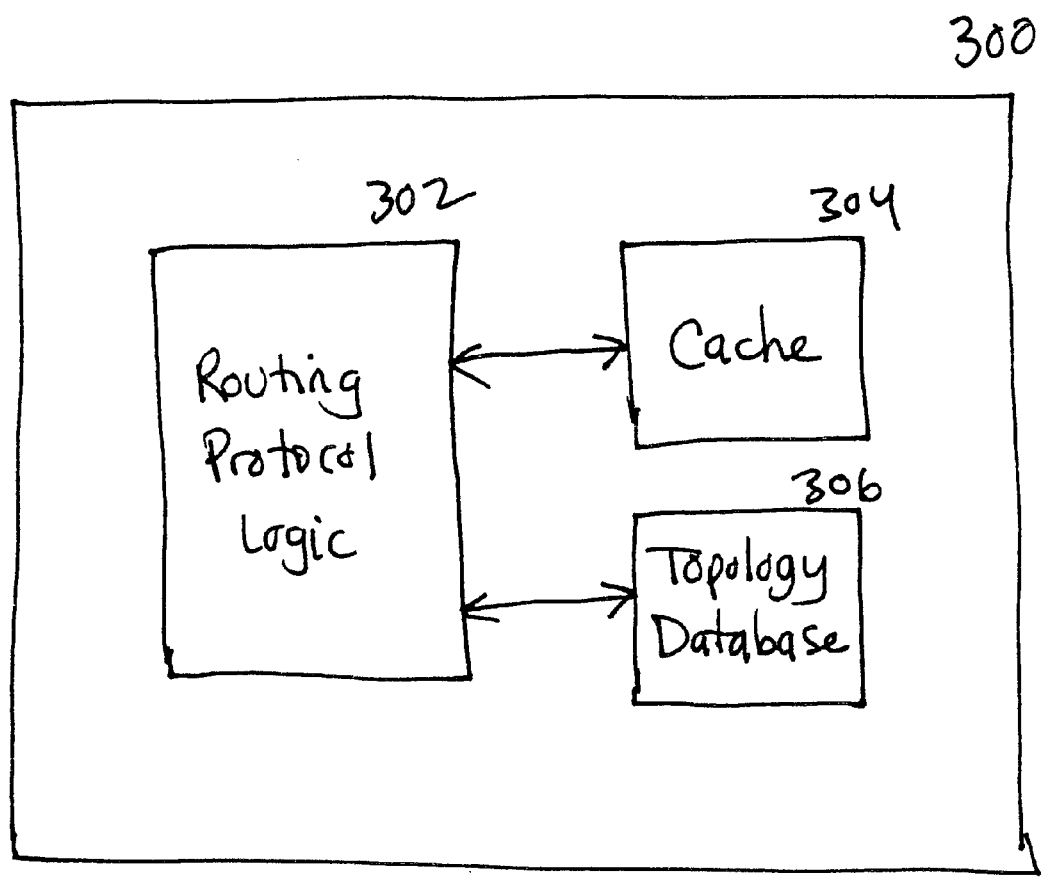
FIG. 3 is a block diagram showing relevant logic blocks of an exemplary node in accordance with an embodiment of the invention.

FIG. 3 is a block diagram showing relevant logic blocks of an exemplary node 300 in accordance with an embodiment of the invention. Among other things, the node 300 includes routing protocol logic 302, a cache 304, and a topology database 306. The cache 304 is used for storing link status information relating to communication link failures. The topology database 306 is used for storing topology information for implementing a link state routing protocol. The routing protocol logic 302 implements the link state routing protocol, and includes the logic 200 for processing a LSA protocol message as shown and described with reference to FIG. 2 above.

In an exemplary embodiment of the present invention, predominantly all of the routing protocol logic is implemented as a set of computer program instructions that are stored in a computer readable medium and executed by an embedded microprocessor system within the node. Various embodiments of the invention may be implemented in any conventional computer programming language. For example, an embodiment may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

I claim:

1. A method for expediting reconvergence by a node in a communication network, the method comprising:

receiving a first indication of a communication link failure from a first supporting node;

determining a second supporting node that is associated with the failed communication link by maintaining a topology database including a list of communication links associated with each of a plurality of nodes, and using the topology database to determine that the second supporting node is associated with the failed communication link;

disassociating the failed communication link from the first supporting node and the second supporting node; and computing new routes accounting for the disassociation of the failed communication link from the first supporting node and the second supporting node.

2. The method of claim 1, wherein the first indication comprises a link state advertisement protocol message including link status information indicating the communication link failure.

3. The method of claim 1, wherein disassociating the failed communication link from the first supporting node and the second supporting node comprises:

removing the failed communication link from the list of communication links associated with the first supporting node in the topology database; and removing the failed communication link from the list of communication links associated with the second supporting node in the topology database.

4. The method of claim 3, wherein computing new routes accounting for the disassociation of the failed communication link from the first supporting node and the second supporting node comprises:

computer new routes based upon the topology database.

5. The method of claim 1, wherein computing new routes accounting for the disassociation of the failed communication link from the first supporting node and the second supporting node comprises running a Dijkstra shortest path computation.

6. The method of claim 1, further comprising:

storing link status information indicating the communication link failure in a cache.

7. The method of claim 1, further comprising:

receiving a second indication of the communication link failure from the second supporting node;

determining that the second indication is related to the first indication; and discarding the second indication without computing new routes.

8. The method of claim 7, wherein determining that the second indication is related to the first indication comprises:

determining that the communication link failure indicated by the second indication is the same as the communication link failure indicated by the first indication.

9. The method of claim 8, wherein determining that the communication link failure indicated by the second indication is the same as the communication link failure indicated by the first indication comprises:

checking for the communication link failure in a cache of communication link failures; and finding the communication link failure in the cache of communication link failures.

10. A device for expediting reconvergence in a communication network, the device comprising routing logic operably coupled to receive a first indication of a communication link failure from a first supporting node, determine a second supporting node that is associated with the failed communication link, disassociate the failed communication link from the first supporting node and the second supporting node, and compute new routes accounting for the disassociation of the failed communication link from the first supporting node and the second supporting node, wherein the routing logic is operably coupled to use a topology database to determine that the second supporting node is associated with the failed communication link, the topology database including a list of communication links associated with each of a plurality of nodes.

11. The device of claim 10, wherein the first indication comprises a link state advertisement protocol message including link status information indicating the communication. link failure.

12. The device of claim 10, wherein the routing logic is operably coupled to remove the failed communication link from the list of communication links associated with the first supporting node in the topology database and remove the failed communication link from the list of communication links associated with the second supporting node in the topology database.

13. The device of claim 12, wherein the routing logic is operably coupled to computer new routes based upon the topology database.

14. The device of claim 10, wherein the routing logic comprises Dijkstra shortest path computation logic operably coupled to compute new routes accounting for the disassociation of the failed communication link from the first supporting node and the second supporting node.

15. The device of claim 10, further comprising a cache, wherein the routing logic is operably coupled to store link status information indicating the communication link failure in the cache.

16. The device of claim 10, wherein the routing logic is operably coupled to receive a second indication of the communication link failure from the second supporting node, determine that the second indication is related to the first indication, and discard the second indication without computing new routes.

17. The device of claim 16, wherein the routing logic is operably coupled to determine that the communication link failure indicated by the second indication is the same as the communication link failure indicated by the first indication.

18. The device of claim 17, further comprising a cache of communication link failures, wherein the routing logic is operably coupled to check for the communication link failure in a cache of communication link failures in order to determine that the communication link failure indicated by the second indication is the same as the communication link failure indicated by the first indication.

19. A program product comprising a computer readable medium having embodied therein a computer program for expediting reconvergence by a node in a communication network, the computer program comprising routing logic programmed to receive a first indication of a communication link failure from a first supporting node, determine a second supporting node that is associated with the failed communication link, disassociate the failed communication link from the first supporting node and the second supporting node, and compute new routes accounting for the disassociation of the failed communication link from the first supporting node and the second supporting node, where the routing logic is programmed to use a topology database to determine that the second supporting node is associated with the failed communication link, the topology database including a list of communication links associated with each of a plurality of nodes.

20. The program product of claim 19, wherein the first indication comprises a link state advertisement protocol message including link status information indicating the communication link failure.

21. The program product of claim 19, wherein the routing logic is programmed to remove the failed communication link from the list of communication links associated with the first supporting node in the topology database and remove the failed communication link from the list of communication links associated with the second supporting node in the topology database.

22. The program product of claim 21, wherein the routing logic is programmed to compute new routes based upon the topology database.

23. The program product of claim 19, wherein the routing logic comprises Dijkstra shortest path computation logic programmed to compute new routes accounting for the disassociation of the failed communication link from the first supporting node and the second supporting node.

24. The program product of claim 19, wherein the routing logic is programmed to store link status information indicating the communication link failure in a cache.

25. The program product of claim 19, wherein the routing logic is programmed to receive a second indication of the communication link failure from the second supporting node, determine that the second indication is related to the first indication, and discard the second indication without computing new routes.

26. The program product of claim 25, wherein the routing logic is programmed to determine that the communication link failure indicated by the second indication is the same as the communication link failure indicated by the first indication.

27. The program product of claim 26, wherein the routing logic is programmed to check for the communication link failure in a cache of communication link failures in order to determine that the communication link failure indicated by the second indication is the same as the communication link failure indicated by the first indication.

28. A communication system comprising a plurality of interconnected nodes including at least a first node, a second node, and a third node, wherein:

the first node and the second node are associated with a failed communication link;

the first node sends a first indication of the failed communication link to the third node;

the third node receives the first indication of the failed communication link from the first node;

the third node maintains a topology database including a list of communication links associated with each of a plurality of nodes and uses the topology database to determine that the second node is associated with the failed communication link;

the third node disassociates the failed communication link from the first supporting node and the second supporting node; and the third node computes new routes accounting for the disassociation of the failed communication link from the first supporting node and the second supporting node.

29. The communication system of claim 28, wherein the first indication comprises a link state advertisement protocol message including link status information indicating the failed communication link.

30. The communication system of claim 28, wherein the third node removes the failed communication link from the list of communication links associated with the first supporting node in the topology database and removes the failed communication link from the list of communication links associated with the second supporting node in the topology database.

31. The communication system of claim 30, wherein the third node computes new routes based upon the topology database.

32. The communication system of claim 28, wherein the third node computes new routes using a Dijkstra shortest path computation.

33. The communication system of claim 28, wherein the third node stores link status information indicating the failed communication link in a cache.

34. The communication system of claim 28, wherein:

the second node sends a second indication of the failed communication link to the third node;

the third node receives the second indication of the failed communication link from the second node;

the third node determines that the second indication is related to the first indication; and the third node discards the second indication without computing new routes.

35. The communication system of claim 34, wherein the third node determines that the communication link failure indicated by the second indication is the same as the communication link failure indicated by the first indication.

36. The communication system of claim 35, wherein the third node checks for the failed communication link in a cache of failed communication links in order to determine that the failed communication link indicated by the second indication is the same as the failed communication link indicated by the first indication.

* * * * *